(12) United States Patent
Humphrey et al.

(10) Patent No.: US 10,886,749 B2
(45) Date of Patent: Jan. 5, 2021

(54) SYNCHRONIZED STARTUP OF POWER SUPPLIES IN ELECTRICAL SYSTEMS

(71) Applicant: HEWLETT PACKARD ENTERPRISE DEVELOPMENT LP, Houston, TX (US)

(72) Inventors: Daniel Humphrey, Houston, TX (US); Stewart G. Goodson, Houston, TX (US); Robin Schrader, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 35 days.

(21) Appl. No.: 16/168,479

(22) Filed: Oct. 23, 2018

(65) Prior Publication Data

US 2020/0127463 A1 Apr. 23, 2020

(51) Int. Cl.
*H02J 3/40* (2006.01)
*G05B 15/02* (2006.01)
(Continued)

(52) U.S. Cl.
CPC ............. *H02J 3/40* (2013.01); *G05B 15/02* (2013.01); *G06F 1/28* (2013.01); *G06F 9/30083* (2013.01); *G06F 9/30087* (2013.01)

(58) Field of Classification Search
CPC ............ H02J 3/38; H02J 3/383; H02M 7/537; H02M 7/72; H02M 7/44; H02M 1/36;
(Continued)

(56) References Cited

U.S. PATENT DOCUMENTS

| 6,614,133 B2 | 9/2003 | Belson et al. |
| 2006/0167569 A1 | 7/2006 | Colombi et al. |

(Continued)

FOREIGN PATENT DOCUMENTS

| CN | 104866053 A | 8/2015 |

OTHER PUBLICATIONS

Robert Kollman, "Power Tip 73: Synchronizing Makes for Well-behaved Power Supplies," EE Times, Jul. 28, 2014, pp. 1-4, Retrieved from the Internet on Jul. 14, 2018 at URL: <eetimes.com/author.asp?section id=183&doc id=1323282>.

(Continued)

*Primary Examiner* — Rexford N Barnie
*Assistant Examiner* — Jagdeep S Dhillon
(74) *Attorney, Agent, or Firm* — Nolte Intellectual Property Law Group (57) ABSTRACT

A method for synchronizing startup of a plurality of power supplies in an electrical system includes supplying input power to a first power supply to supply power to an auxiliary converter and an auxiliary controller. The method also includes monitoring, via the auxiliary controller, a signal shared by each of the plurality of power supplies. The method further includes incrementally increasing, via the auxiliary controller, a value of the shared signal to a next incremental value of a plurality of specified values. The method also includes enabling, via the auxiliary controller, each of the power supplies to supply power to a load when the value of the shared signal is set to a maximum value of the specified values.

13 Claims, 6 Drawing Sheets

(51) Int. Cl.
*G06F 1/28* (2006.01)
*G06F 9/30* (2018.01)

(58) Field of Classification Search
CPC .......... H02M 1/02; H02M 3/04; H02M 3/156; G06F 1/26; G06F 11/30; H02S 40/32; H02S 10/00; H01L 31/042
USPC ................ 307/84, 43, 38, 32, 64, 82, 83
See application file for complete search history.

(56) References Cited

U.S. PATENT DOCUMENTS

| | | | | |
|---|---|---|---|---|
| 2008/0320322 | A1* | 12/2008 | Green | G06F 1/263 |
| | | | | 713/340 |
| 2009/0283128 | A1* | 11/2009 | Zhang | H02J 3/383 |
| | | | | 136/244 |
| 2012/0091810 | A1* | 4/2012 | Aiello | H02J 1/102 |
| | | | | 307/64 |
| 2013/0088081 | A1* | 4/2013 | Siri | H02J 2207/40 |
| | | | | 307/46 |
| 2013/0155736 | A1* | 6/2013 | Ilic | H02M 7/72 |
| | | | | 363/71 |
| 2015/0256060 | A1* | 9/2015 | Faingersh | H02M 1/36 |
| | | | | 323/267 |
| 2015/0340868 | A1* | 11/2015 | Chapman | H02J 3/381 |
| | | | | 307/82 |
| 2016/0164298 | A1* | 6/2016 | Baba | H02J 3/385 |
| | | | | 307/24 |
| 2016/0172861 | A1* | 6/2016 | Baba | H02J 3/383 |
| | | | | 307/78 |
| 2017/0163245 | A1* | 6/2017 | Iyer | H02J 3/20 |
| 2018/0309387 | A1* | 10/2018 | Hosokawa | H02S 40/32 |
| 2019/0165724 | A1* | 5/2019 | Fernandez Luque | H02H 9/041 |

OTHER PUBLICATIONS

SSI, "EPS1U Power Supply Design Guide," 2001, pp. 1-31, Version 1.1.

* cited by examiner

SYNCHRONIZED STARTUP OF POWER SUPPLIES IN ELECTRICAL SYSTEMS

BACKGROUND

Electrical systems typically found in data centers may include a multitude of electrical loads consuming power supplied by a plurality of power sources. Such electrical loads may include a main load for carrying out the primary operations of the electrical system. Example devices included in the main load may include computing devices, such as server blades, and network devices, such as gateway devices and routers.

In addition to the main load, the electrical system may include an auxiliary load, commonly referred to as a management load or a standby load. The standby load may include, for example, logic devices or other electrical devices consuming standby power and capable of permitting the electrical system to rapidly start or to perform selected operations of the electrical system while the remainder of the electrical system is powered off. Example devices included in the auxiliary load may include sensors, controllers, and communication ports.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10% unless otherwise expressly specified. Moreover, examples herein are intended to be illustrative only and are presented for discussion purposes and not by way of limitation.

An example electrical system commonly forming part of a data center may include a multitude of computing nodes, their associated storage hierarchies, and interconnection infrastructure. The computing nodes may include a variety of computing devices, such as, for example, servers. Each computing device is typically constructed from a plurality of electronic components. Example electronic components may include, but are not limited to, CPUs, GPUs, and memory devices, such as dual inline memory modules (DIMMs).

In operation, each of the electronic components generates heat. Accordingly, the electrical system may implement an air-cooling system, a liquid cooling system, or a combination thereof to reduce the heat generated by the electronic components to prevent impaired performance or failure of the electronic components, and in turn, the computing devices. In air-cooled electrical systems, fans, compressors, and air conditioners may be implemented to cool the electronic components. In liquid-cooled electrical systems, pumps may be implemented to circulate a liquid coolant to cool the electronic components of the computing devices.

The foregoing components generally may be part of or may be the main load of the electrical system and may consume between about ten kilowatts and about forty kilowatts of power in an example electrical system. In addition to the main load, the electrical system may include an auxiliary load including, for example, electrical devices operable to rapidly start the electrical system or to operate selected components of the electrical system while the remainder of the electrical system is powered off. Example devices included in the auxiliary load may include, but are not limited to, sensors, controllers, and communication ports. In some large-scale electrical systems, auxiliary loads may include computing devices capable of monitoring power supply and power consumption of the electrical system. In such large-scale electrical systems, the auxiliary load may consume, for example, about three hundred watts of power or more.

Based on the number and types of loads (e.g., computing nodes, cooling components, and related infrastructure), the electrical system further includes a plurality of power supplies to supply power to be consumed by each of the main load and the auxiliary load. To ensure sufficient power is provided to the loads, the electrical system typically includes redundant power supplies to ensure that up to twice the designated maximum power of the electrical system is available at any given time. In some alternative approaches, each power supply may provide a single output to power the main load and the auxiliary load. In other alternative approaches, each power supply may provide respective outputs to power the main load and the auxiliary load.

Certain drawbacks are notable in alternative approaches in which each power supply provides a single output to power both the main load and the auxiliary load. As the main load and the auxiliary load consume a disproportionate amount of power, the efficiency of the power supplies may be reduced when the main load is disabled or the power consumption thereof is reduced. Additionally, a fault in the single output may result in the loss of power to the auxiliary load, which may lead to loss of operation of the auxiliary load and thus, the inability to start components of the main load.

Accordingly, in other alternative approaches, each power supply provides respective outputs to power the main load and the auxiliary load. In such implementations, an auxiliary converter may be implemented to convert the input power provided to the power supply to an auxiliary output to power the auxiliary load. Based on a cost and volume perspective, auxiliary converters are typically limited to an output of twenty-five watts. Generally, it has been found that auxiliary converters capable of outputting greater than twenty-five watts are typically cost-prohibitive, and additionally, are larger in size than desirable for the location in which the standby converter is to be disposed.

Thus, in example electrical systems including auxiliary loads consuming hundreds of watts of power, power supplies providing respective dedicated outputs to the auxiliary load are often electrically coupled in parallel to supply a sufficient amount of power from each auxiliary converter to power the auxiliary load. For example, in an electrical system having an auxiliary load of three hundred watts, twelve power supplies providing twenty-five watts each from their respective auxiliary converters may be utilized to power the auxiliary load.

Although effective to supply a sufficient amount of power, a drawback to such an arrangement has been realized. Generally, in such approaches, an auxiliary converter is automatically enabled in response to the input power being supplied to the power supply, but the auxiliary converters may not necessarily all become enabled at precisely the same time. Accordingly, the first auxiliary converter to be enabled sees the entire auxiliary load, or, if a few auxiliary converters are the first to become enabled simultaneously, then those few auxiliary converters will share the entire auxiliary load. Thus, for a period of time after the first auxiliary converter(s) become(s) enabled, the number of auxiliary converters supplying power to the auxiliary load may be less than the number of auxiliary converters required to safely (i.e., within design parameters) supply the auxiliary load, and therefore the auxiliary load may draw more current from each of the first-enabled auxiliary converters than they are designed to supply. Thus, one or more auxiliary converters may be subject to overcurrent, and thus shutdown thereof.

Accordingly, examples of the present disclosure are directed to electrical systems capable of synchronizing the beginning of supply of power from the power supplies to the auxiliary load in a manner that addresses the drawbacks of the aforementioned electrical systems. Particularly, in one or more examples of the present disclosure, each power supply in an electrical system is configured to, upon receiving input power and before enabling its auxiliary converter to supply power to the auxiliary load: monitor a signal shared by each of the plurality of power supplies; incrementally increase the voltage of the shared signal when the power supply is ready to supply auxiliary power and, if doing so causes the shared signal to reach a threshold value, set the signal to a specified value (e.g., a maximum value); and when the signal is set to the specified value, enable its auxiliary converter to supply power to the auxiliary load.

The threshold value may be designed to correspond to a minimum number of auxiliary converters that are desired to safely supply power to the auxiliary load—that is, when the shared signal reaches the threshold value, this indicates that a sufficient number power supplies are ready to supply power to the auxiliary load to safely proceed. For example, the threshold value may be equal to or higher than the minimum desired number of auxiliary converters times an amount by which each power supply increments the shared signal when it is ready to supply auxiliary power. For example, if a minimum of six (6) auxiliary converters are desired to supply power to the auxiliary load and if the power supplies increment the shared signal by 0.5 V, then the threshold value may be 3.0 V.

Because each of the power supplies enables its auxiliary converter to supply power to the auxiliary load when the shared signal is set to the specified value (e.g., maximum value), the beginning of the supply of power to the auxiliary load may be synchronized among those power supplies that are ready. Furthermore, because the shared signal is set to the specified value only after a sufficient number of power supplies are ready to supply power to the auxiliary load (i.e., when the signal has reached the threshold value), when those power supplies begin supplying power in synchronization with one another none of those power supplies draws too much current and overcurrent of any of the power supplies may be prevented.

In some examples, power supplies that become ready to supply power to the auxiliary load after the initial group of power supplies has already begun supplying power to the auxiliary load may automatically start supplying power to the auxiliary load without having to go through the above-noted operations pertaining to the shared signal. For example, each of the power supplies may be configured to first check whether power is already being supplied to the auxiliary load (and/or the main load) by other power supplies before going through the above-noted operations pertaining to the shared signal. If power is already being supplied, then the above-noted operations may be skipped and the power supply may automatically begin supplying power to the auxiliary load whenever it is ready. If power is not already being supplied, then the power supply may go through the above noted operations pertaining to the shared signal.

More particularly, in one example of the present disclosure, a method is provided for synchronizing startup of a plurality of power supplies electrically coupled in parallel. The method may include supplying input power to a first power supply to supply power to an auxiliary converter and an auxiliary controller. The method may also include monitoring, via the auxiliary controller, a signal shared by each of the plurality of power supplies. The method may further include incrementally increasing, via the auxiliary controller, a value of the shared signal to a next incremental value of a plurality of specified values. The method may also include enabling, via the auxiliary controller, each of the power supplies to supply power to a load when the value of the signal is set to a maximum value of the specified values.

In another example of the present disclosure, an electrical system is provided and may include a main load, an auxiliary load, and a plurality of power supplies. The plurality of power supplies may operate in parallel with one another to supply power to each of the main load and the auxiliary load. Each power supply may include a main converter, an auxiliary converter, an auxiliary controller, and a computer-readable storage medium. The main converter may supply power to the main load via a main output. The auxiliary converter may supply power to the auxiliary load via an auxiliary output. The auxiliary controller may be electrically coupled to the auxiliary converter. The auxiliary controller further may be communicatively coupled to each auxiliary controller of the other power supplies via a shared signal.

The computer-readable storage medium may include instructions executable by the auxiliary controller to: monitor the shared signal; incrementally increase a value of the shared signal to a next incremental value of a plurality of specified values; determine whether the next incremental value is a threshold value; set the shared signal to a maximum value of the plurality of specified values when the next incremental value is the threshold value; and enable the auxiliary converter to supply power to the auxiliary load when the value of the shared signal is set to a maximum value of the plurality of specified values.

In another example of the present disclosure, a non-transitory computer-readable medium is provided and includes computer executable instructions stored thereon that when executed by a processor, cause the processor to: monitor a signal shared by a plurality of power supplies connected in parallel to an auxiliary load; incrementally increase a value of the shared signal to a next incremental value of a plurality of specified values; determine whether the next incremental value is a threshold value; set the shared signal to a maximum value of the plurality of specified values when the next incremental value is the threshold value; and enable each of the power supplies to supply power to the auxiliary load when the value of the shared signal is set to a maximum value of the plurality of specified values.

Figure 1:
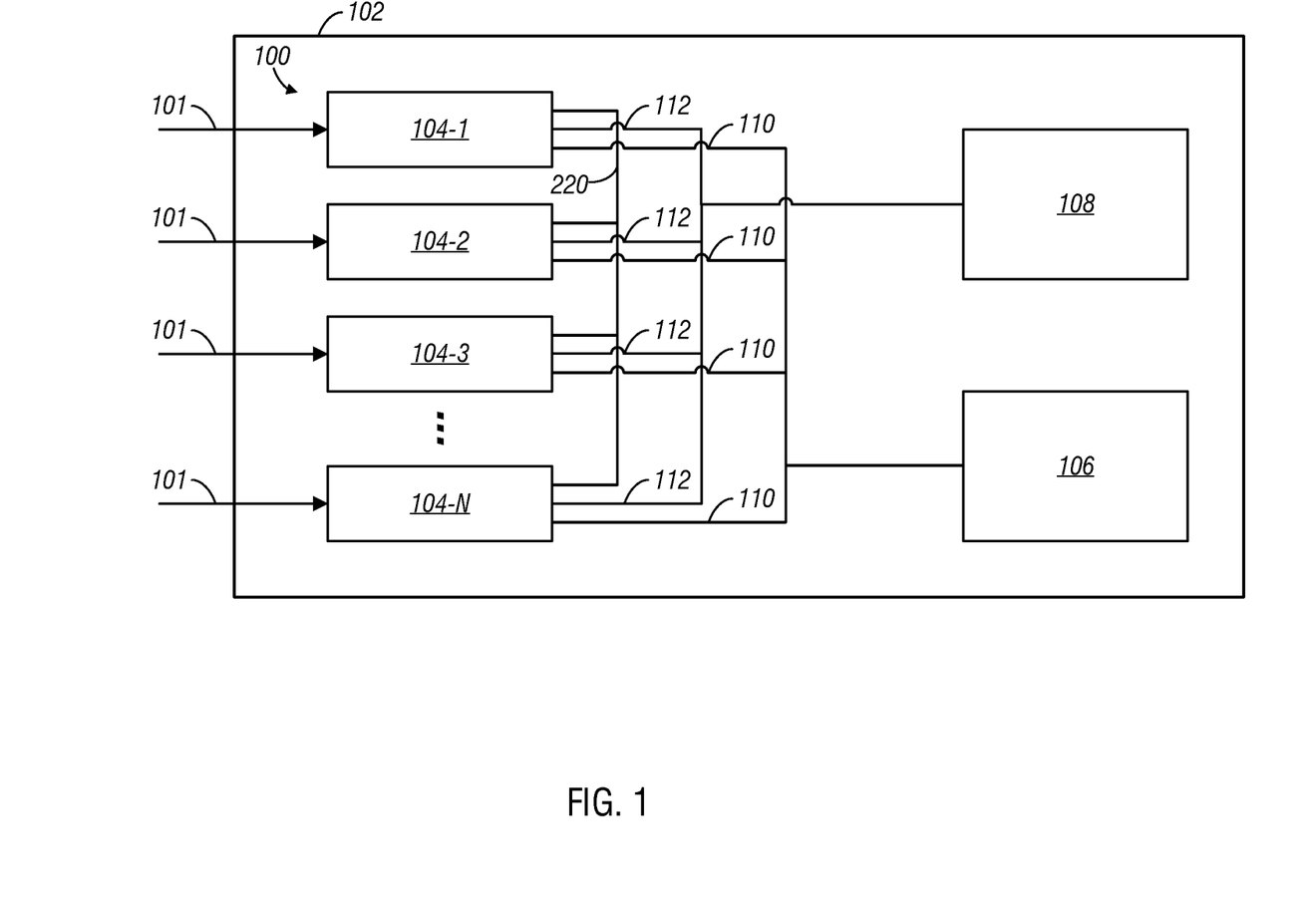
FIG. 1 is a block diagram of an electrical system, according to one or more examples of the disclosure.

Turning now to the drawings, FIG. 1 is a block diagram of an electrical system 100, according to one or more examples of the disclosure. In one or more implementations, the electrical system 100 may be part of a data center (not otherwise shown) electrically coupled to an electrical power grid (not shown) to receive input power 101 therefrom. As illustrated in FIG. 1, the electrical system 100 is housed in an enclosure 102. The enclosure 102 may be installed in a server rack (not shown) along with a plurality of other enclosures or chassis in a stacked arrangement. In one or more implementations, a plurality of server racks and accompanying infrastructure may be included in the datacenter.

As illustrated in FIG. 1, the electrical system 100 includes a plurality of power supplies 104-1 through 104-N (also referred to collectively as power supplies 104 or individually and generally as a power supply 104) electrically coupled to a plurality of loads 106, 108. The plurality of loads 106, 108 may include a main load 106 and an auxiliary load 108. Generally, the main load 106 consumes a disproportionate amount of power in relation to the auxiliary load 108. In one or more implementations, the main load 106 may include load elements (not separately shown) of the electrical system 100 running during standard operation of the electrical system 100. Examples load elements may include, but are not limited to, computing devices (e.g., servers), storage devices, network devices (e.g., gateway devices and routers), and cooling devices (e.g., fans or pumps).

In one or more implementations, the auxiliary load 108 may include load elements (not separately shown) of the electrical system 100 implemented to rapidly start the electrical system 100 from a low power or powered off state. In other implementations, the auxiliary load 108 may be referred to as a standby load and may include load elements of the electrical system 100 utilized during standby operations of the electrical system 100 while the remainder of the electrical system 100 is in a powered off state. In yet other implementations, the auxiliary load 108 may be referred to as a management load and may include load elements of the electrical system 100 utilized to manage the electrical system 100, such as management devices to remotely log into the electrical system 100, to install firmware, and to monitor power supplied and consumed in the electrical system 100. Still yet, in other implementations, the auxiliary load 108 may include a standby load, a management load, or a combination thereof.

As illustrated in FIG. 1, the power supplies 104 may be electrically coupled in parallel to each of the main load 106 and the auxiliary load 108. In one or more implementations, the power supplies 104 may be electrically coupled in parallel to the main load 106 via respective main outputs 110 of the power supplies 104. Likewise, the power supplies 104 may be electrically coupled in parallel to the auxiliary load 108 via respective auxiliary outputs 112 of the power supplies 104. The plurality of power supplies 104 may include redundant power supplies 104 to ensure sufficient power is provided to the main load 106 to drive the main load 106 at full utilization. Accordingly, in one or more implementations, the electrical system 100 may be N+N redundant, where N is the number of power supplies 104 dedicated to power the main load 106. In other implementations, the electrical system 100 may be N+1 redundant. In either implementation, redundancy provides the electrical system 100 with an available power supply greater than the power consumed by the main load 106.

Figure 2:
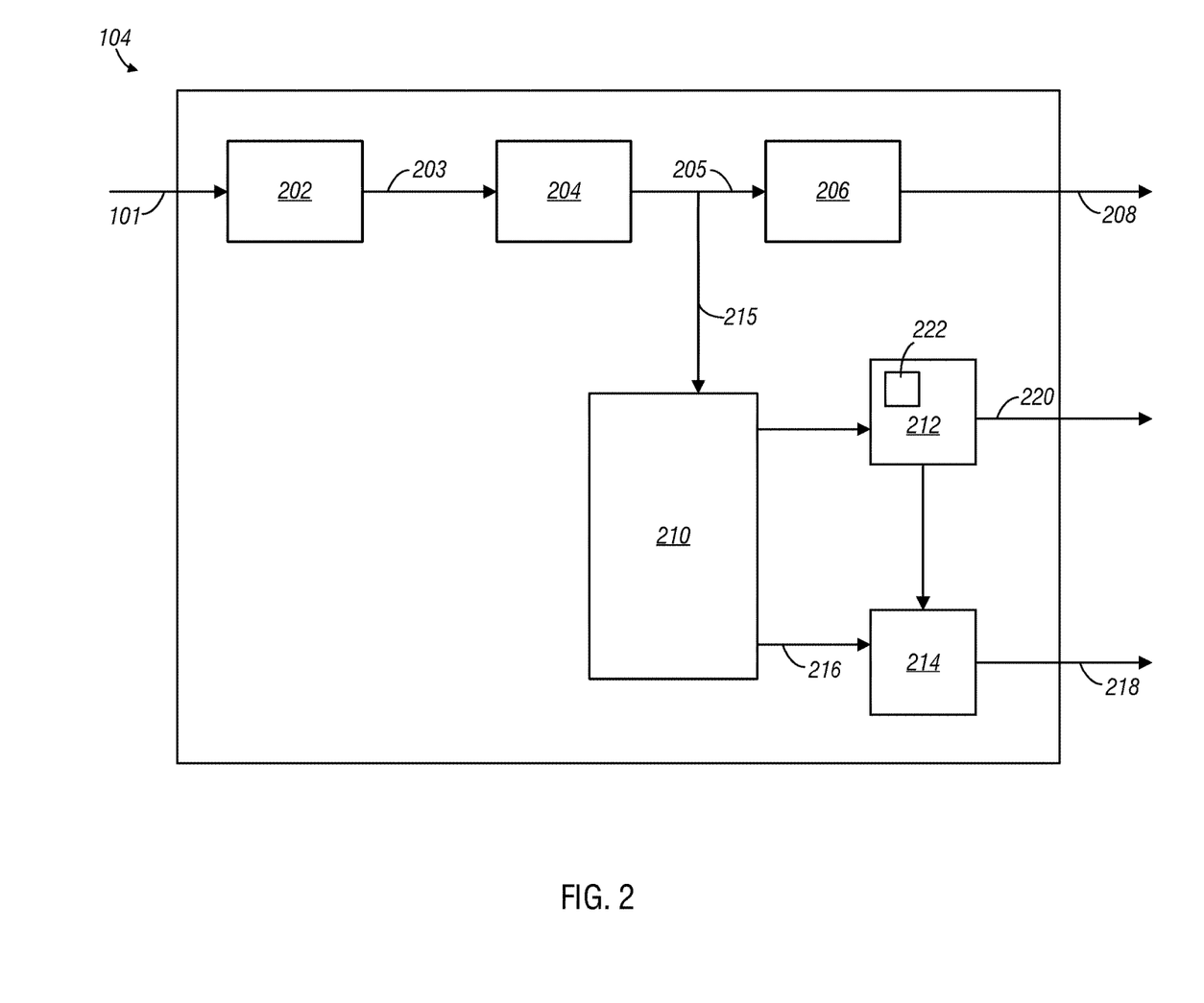
FIG. 2 is a block diagram of a power supply utilized in the electrical system of FIG. 1, according to one or more examples of the disclosure.

Referring now to FIG. 2 with continued reference to FIG. 1, FIG. 2 is a block diagram of a power supply 104 utilized in the electrical system 100 of FIG. 1, according to one or more examples of the disclosure. The power supply 104 may be electrically coupled to an AC power source, such as an electrical grid (not shown), and may receive input power 101 therefrom. As illustrated in FIG. 2, the power supply 104 may include an electromagnetic interference (EMI) filter and rectifier 202 configured to receive the input power 101 from the AC power source and to reduce interference from electrical noise and to convert the input power 101 to a DC input power 203. The rectifier 202 may be a half wave or a full wave bridge rectifier. Although illustrated as a single block, in one or more implementations, the EMI filter and the rectifier 202 may be separate circuits.

The power supply 104 may include a power factor correction (PFC) circuit 204 electrically coupled to the rectifier 202 and configured to correct the power factor to the power supply 104. The DC input power 203 may be split after exiting the PFC circuit 204 and a first portion 205 of the DC input power 203 may be directed to a main converter 206 electrically coupled to the PFC circuit 204. In one or more implementations, the main converter 206 may be a DC/DC converter to convert the first portion 205 of the DC input power 203 to a different voltage to provide a main output 208 to the main load 106. The main output 208 may be determined based on the main load 106 and the number of other power supplies 104 in parallel within the electrical system 100.

The power supply 104 may further include an auxiliary converter 210, an auxiliary controller 212, and a switch 214. As illustrated in FIG. 2, a second portion 215 of the DC input power 203 may be fed to the auxiliary converter 210 after exiting the PFC circuit 204. In one or more implementations, the PFC circuit 204 may be omitted and the DC input power 203 from the rectifier 202 may be fed to the auxiliary converter 210. The auxiliary converter 210 may have multiple outputs and may be configured to power the auxiliary controller 212, voltage and current feedback sensing electronics (not shown), and system fans (not shown). To that end, the auxiliary converter 210 may be a DC-DC converter generating multiple outputs to the aforementioned components ranging from about 5 W to about 40 W in one or more implementations.

Each of the auxiliary controller 212 and the switch 214 may be electrically coupled to the auxiliary converter 210 as shown in FIG. 2. The auxiliary controller 212 and the switch 214 may be further electrically coupled to one another to permit the auxiliary controller 212 to determine the opened or closed state of the switch 214. In one or more implementations, the switch 214 may be a MOSFET switch. In another implementation, the switch 214 may be a regulator in instances in which the auxiliary converter output 216 is not adequately controlled.

In some implementations, various protection units (not shown) and/or an optocoupler (not shown) may isolate the auxiliary controller 212 from the switch 214. The switch 214 in conjunction with the auxiliary controller 212 may control the voltage of an auxiliary output 218 exiting from the switch 214. In one or more implementations, the voltage of the auxiliary output 218 may be substantially equal to the auxiliary converter output 216; however, in other implementations, the switch 214, as a regulator, may alter the voltage of the auxiliary converter output 216 to provide the auxiliary output 218 with a different voltage.

As most clearly shown in FIG. 1, the auxiliary controllers 212 in the power supplies 104 may be communicatively coupled with one another via a shared signal 220. The shared signal 220 may be adjusted (e.g., incremental changes in the value) by any of the auxiliary controllers 212 and as such, arbitration may be utilized to determine the auxiliary controller 212 controlling the shared signal 220. In one or more implementations, the shared signal 220 may be represented by a voltage and the voltage may be incremented within a range between about zero volts and about 3.3 volts. Accordingly, in such implementations, a maximum value or voltage of the shared signal is about 3.3 volts. In one or more implementations, the shared signal 220 may be a signal that is not utilized during startup of the auxiliary load 108. In other implementations, the shared signal may be a dedicated signal for communication between power supplies 104.

Figure 3:
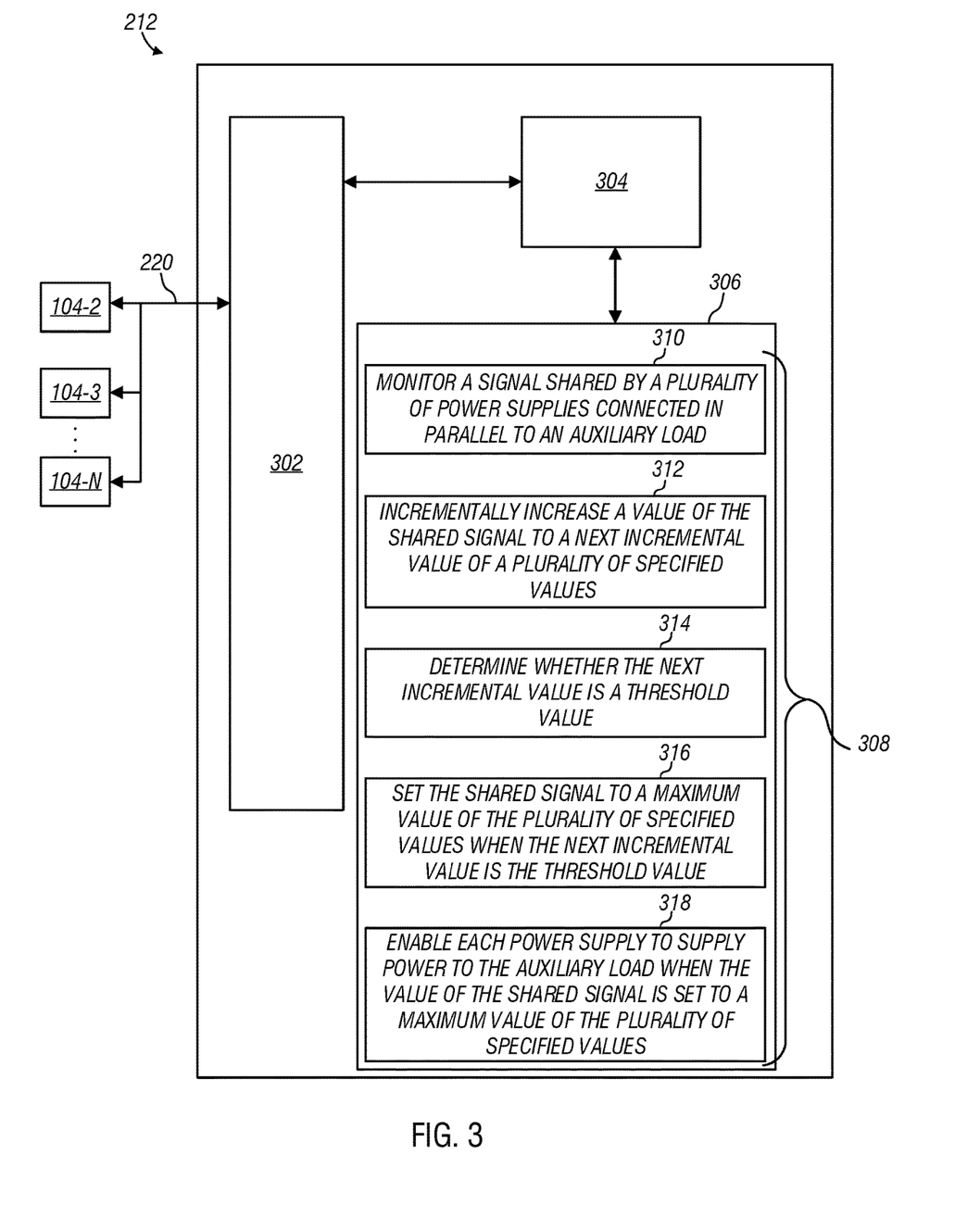
FIG. 3 is a block diagram of a controller utilized in the power supplies of FIG. 1 and FIG. 2, according to one or more examples of the disclosure.

Referring now to FIG. 3 with continued reference to FIGS. 1 and 2, FIG. 3 is a block diagram of the auxiliary controller 212 utilized in the power supply 104 of FIG. 2, according to one or more examples of the disclosure. The auxiliary controller 212 may include a communications interface 302 communicatively coupled to the other power supplies 104 and one or more processors 304 (one shown). A non-transitory computer-readable medium 306 may be communicatively coupled to the processor(s) 304 and the communications interface 302.

As illustrated in FIG. 3, the non-transitory computer-readable medium 306 may store instructions 308 that, when executed by the processor(s) 304, cause the processor(s) 304 to: monitor the signal 220 shared by a plurality of power supplies 104 connected in parallel to an auxiliary load 108 (block 310 incrementally increase a value of the shared signal 220 to a next incremental value of a plurality of specified values (block 312); determine whether the next incremental value is a threshold value (block 314); set the shared signal 220 to a maximum value of the plurality of specified values when the next incremental value is the threshold value (block 316); and enable each of the power supplies 104 to supply power to the auxiliary load 108 when the value of the shared signal 220 is set to a maximum value of the plurality of specified values (block 318).

Moreover, the instructions 308 may be configured to cause the processor 304 to perform any of the operations of the methods 400, 500, and/or 600, shown in FIGS. 4-6, respectively, which are described in greater detail below. The non-transitory computer-readable storage medium 306 may be integrated in the auxiliary controller 212 as shown in FIG. 3, or the non-transitory computer-readable storage medium 306 may be separate from but accessible to the auxiliary controller 212.

In one example, the stored instructions 308 can be part of an installation package that when installed can be executed by the processor(s) 304 to implement the electrical system 100 as provided in more detail below. In this case, the non-transitory computer-readable storage medium 306 may be a portable medium such as an optical disk (e.g., compact disc (CD) or digital video disc (DVD)), or flash drive or a memory maintained by a server from which the installation package can be downloaded or installed. In another example, the stored instructions 308 may be part of an application or applications already installed. Here, the non-transitory computer-readable storage medium 306 can include integrated memory such as hard drive, solid state drive, and the like.

Although the example illustrated in FIG. 3 shows the auxiliary controller 212 being implemented with a processor 304 that is to execute instructions 308, it should be understood that the auxiliary controller 212 could also be implemented, in whole or in part, using dedicated hardware, such as application-specific integrated circuits (ASICs), complex programmable logic devices (CPLD), and so on. In general, the auxiliary controller 212 may include logic that is to: monitor the signal 220 shared by a plurality of power supplies 104 connected in parallel to an auxiliary load 108; incrementally increase a value of the shared signal 220 to a next incremental value of a plurality of specified values; determine whether the next incremental value is a threshold value; set the shared signal 220 to a maximum value of the plurality of specified values when the next incremental value is the threshold value; and enable each of the power supplies 104 to supply power to the auxiliary load 108 when the value of the shared signal 220 is set to a maximum value of the plurality of specified values, and this logic may include any combination of processors (such as the processor(s) 304), machine readable instructions (such as the instructions 308), and dedicated hardware.

Example methods 400, 500, and 600 for operating the electrical system 100 will now be discussed, in the context of FIGS. 1-3, and with reference to FIGS. 4-6. The example methods 400, 500, and/or 600 may be performed, for example, by controllers of an electrical system 100, such as the auxiliary controllers 212. For example, each auxiliary controller 212 may execute instructions 308 that causes the auxiliary controller 212 to perform some or all of the operations of the methods 400, 500, and/or 600. As another example, each auxiliary controller 212 may include dedicated hardware that performs some or all of the operations of the methods 400, 500, and/or 600.

Figure 4:
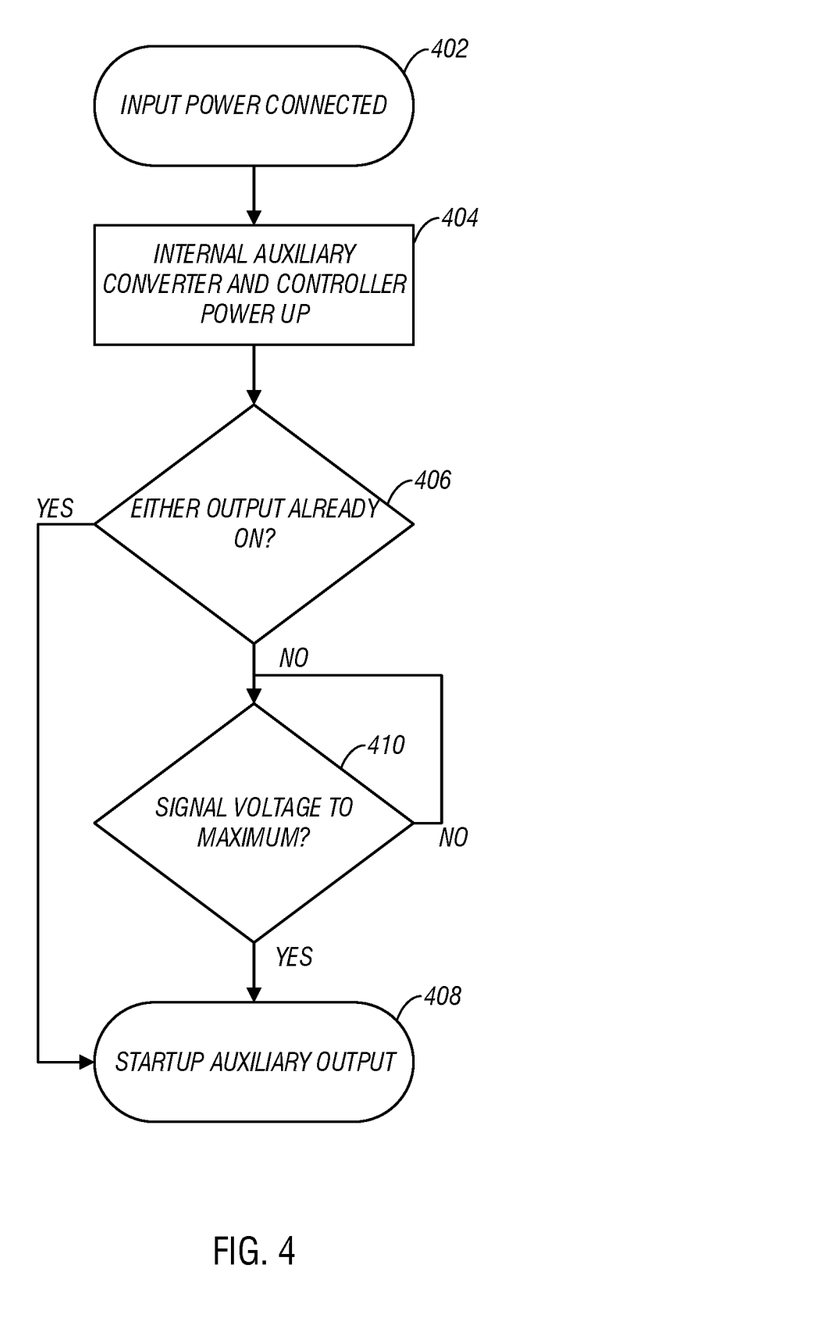
FIG. 4 is a flow chart depicting a method for operating an electrical system, according to one or more examples of the disclosure.

Referring now to FIG. 4 with continued reference to FIGS. 1-3, FIG. 4 is a flowchart depicting a method 400 for operating an electrical system, according to one or more examples of the disclosure. In discussing FIG. 4, reference is made to the electrical system 100 of FIG. 1, the power supply 104 of FIG. 2, and the auxiliary controller 212 of FIG. 3 to provide contextual examples. Implementation, however, is not limited to those examples.

The method 400 starting at block 402 may include supplying input power 101 from an external AC source to a power supply 104 of the plurality of power supplies 104 included in the electrical system 100. The input power 101 may supply power to an auxiliary converter 210 and an auxiliary controller 212 of the power supply 104, as at block 404. The auxiliary controller 212 may determine whether a main load 106 or an auxiliary load 108 connected to the power supplies 104 is being powered by at least one other power supply 104, as at block 406. If the auxiliary controller 212 detects that either the auxiliary load 108 or the main load 106 is being powered by at least one other power supply 104 of the plurality of power supplies 104, the auxiliary controller 212 enables the power supply 104 to supply power to the auxiliary load 108 (block 408), as the auxiliary load 108 is already powered and thus, enabling the power supply 104 will not produce an overcurrent. If the main load 106 or the auxiliary load 108 is not powered by at least one other power supply 104, the auxiliary controller 212 may monitor a signal 220 shared by each of the plurality of power supplies 104, as at block 410. When the shared signal 220 is set to a maximum value, each auxiliary controller 212 enables the respective power supply 104 to supply power to the auxiliary load 108, as at block 408.

Figure 5:
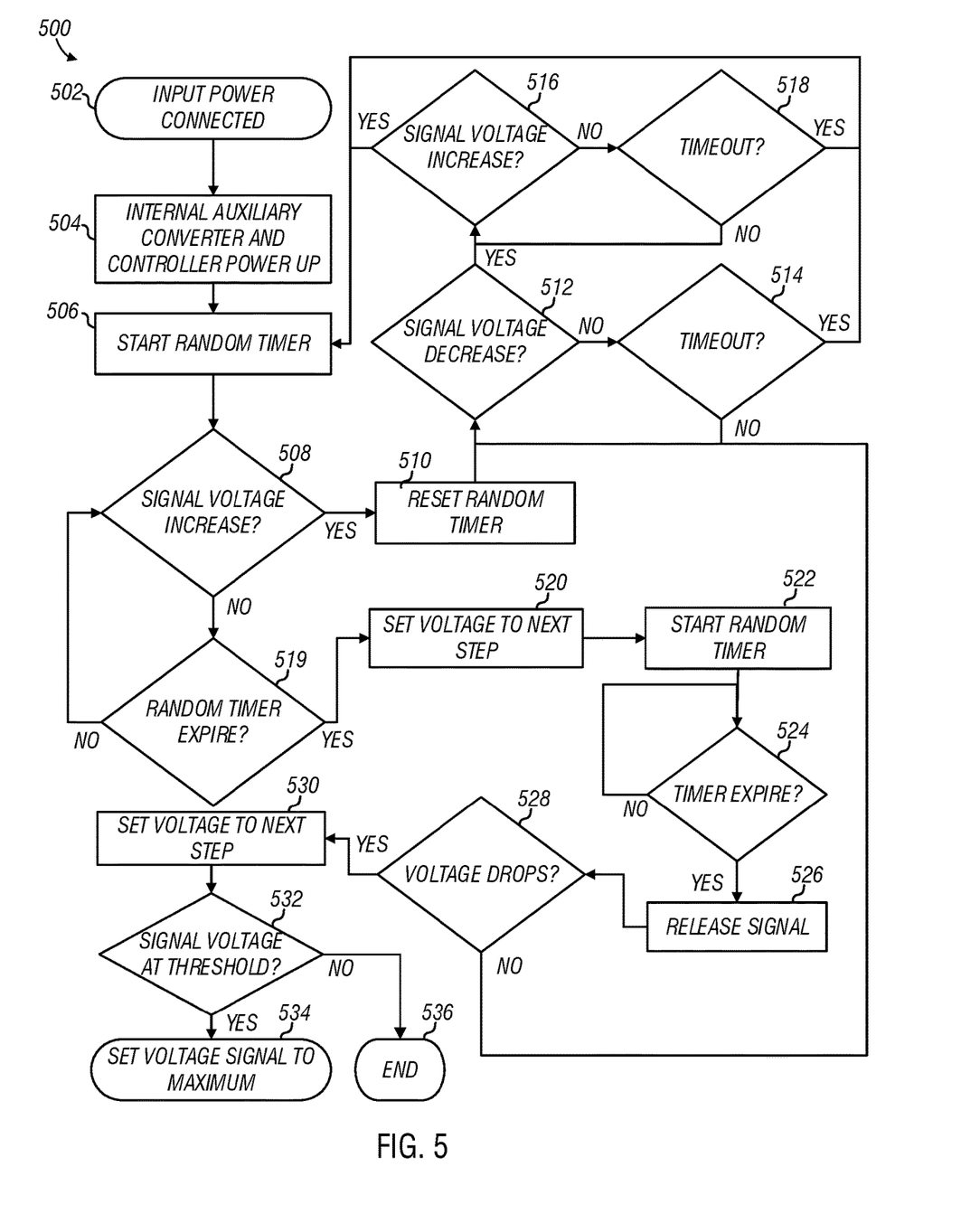
FIG. 5 is a flow chart depicting a method for operating an electrical system, according to one or more examples of the disclosure.

Turning now to FIG. 5 with continued reference to FIGS. 1-3, FIG. 5 is a flowchart depicting a method 500 for operating an electrical system, according to one or more examples of the disclosure. In discussing FIG. 5, reference is made to the electrical system 100 of FIG. 1, the power supply 104 of FIGS. 1 and 2, and the auxiliary controller 212 of FIGS. 2 and 3 to provide contextual examples. Implementation, however, is not limited to those examples.

The method 500 starting at block 502 may include supplying input power 101 from an external AC source to a first power supply 104 of the plurality of power supplies 104 included in the electrical system 100. The input power 101 may supply power to an auxiliary converter 210 and an auxiliary controller 212 of the first power supply 104, as at block 504. Although not illustrated in the flowchart of FIG. 5, after powering the auxiliary controller 212 as in block 504, the auxiliary controller 212 may determine whether a main load 106 or an auxiliary load 108 connected to the power supplies 104 is being powered by at least one other power supply 104, similar to block 406 of FIG. 4.

In one or more implementations, the auxiliary controller 212 may detect that the auxiliary load 108 is being powered based on the value of the signal 220 shared by the power supplies 104. For example, if the value of the shared signal 220 (referenced in one or more implementations as a voltage), is determined to be at a maximum value (e.g., 3.3 volts), the auxiliary load 108 is being powered by at least one other power supply 104. If the auxiliary controller 212 detects that the auxiliary load 108 or the main load 106 is being powered by at least one other power supply 104 of the plurality of power supplies 104, the auxiliary controller 212 enables the first power supply 104 to supply power to the auxiliary load 108, as the auxiliary load 108 is already powered and thus, enabling the first power supply 104 will not produce an overcurrent.

Turning now to block 506, the method 500 of operation continues for occurrences where the auxiliary controller 212 determined that neither the main load 106 nor the auxiliary load 108 is powered by at least one other power supply 104. In block 506, a timer 222 executable by the auxiliary controller 212 of the first power supply 104 may be started for a first interval. The first interval may be randomly generated by the auxiliary controller 212, and thus, may vary with respect to other intervals generated by the timers 222 of the auxiliary controllers 212 of the other power supplies 104. For example, the first interval of the timer 222 may be 200 microseconds in one or more implementations. Generally, each interval randomly generated by the auxiliary controller 212 is of a sufficient duration to prevent race conditions from minimal power supply to power supply delays. For example, if the auxiliary controller 212 takes 10 microseconds to alter the shared signal 220, then the interval of the random timer may be 200 microseconds.

In block 508, the auxiliary controller 212 of the first power supply 104 may monitor the signal 220 shared by the auxiliary controllers 212 of the respective power supplies 104 for an incremental change in value of the shared signal 220 by a parallel power supply 104 during the first interval of the timer 222 of the first power supply 104. In one or more implementations, the value of the shared signal 220 may be represented as a voltage of the shared signal 220. An incremental change in value of the shared signal 220 before the expiration of the first interval may be indicative of an interval of another power supply's timer 222 expiring first and the auxiliary controller 212 of the other power supply 104 incrementing the value of the shared signal 220. Accordingly, if the auxiliary controller 212 of the first power supply 104 determines that an incremental change in value of the shared signal 220 occurred during the first interval of the timer 222 of the first power supply 104, the auxiliary controller 212 of the first power supply 104 may reset the timer 222 thereof, as at block 510. By resetting the timer 222, the first power supply 104 effectively relinquishes potential control of the shared signal 220 to the parallel power supply 104 incrementing the value of the shared signal 220.

As used herein, the term "shared signal" refers to a signal in which none of the power supplies 104 is indefinitely in exclusive control of the signal. Although, a power supply 104 may temporarily control the "shared signal", the control is for a limited duration. Accordingly, none of the power supplies includes a predetermined "master" controller manipulating the other auxiliary controllers 212 of the power supplies 104.

Further, as used herein, incrementing the value of the shared signal 220 may be determined by the power consumed by the auxiliary load 108, and thus the power to be supplied by the power supplies 104. For example, if the auxiliary load 108 consumes 100 watts and each power supply may supply 25 watts, then the shared signal will be incremented four times to reach a threshold value that each auxiliary controller 212 may utilize to determine that sufficient power is available to supply the auxiliary load 108 to avoid an overcurrent of any one or more power supplies 104. Thus, if the threshold value is 400 millivolts in the aforementioned example, each increment in the value of the shared signal 220 would be 100 millivolts if starting from zero volts.

In instances in which the timer 222 of one of the parallel power supplies 104 expires before the first interval and thus increments the value of the shared signal 220, the parallel power supply 104 responsible for incrementing the value of the shared signal 220 may decrease and increase the value of the shared signal 220 to verify that the parallel power supply 104 has control of the shared signal 220. This is carried out to eliminate race conditions for varied start up times of the power supplies 104. Accordingly, at block 512, after resetting the timer 222 of the first power supply 104, the auxiliary controller 212 of the first power supply 104 may monitor the shared signal 220 for a decrease in value of the shared signal 220.

If the auxiliary controller 212 does not detect a decrease in the value of the shared signal 220 for a specified period of time, as at block 514, the auxiliary controller 212 restarts the timer 222, as at 506. If the auxiliary controller 212 detects a decrease in the value of the shared signal 220, the auxiliary controller 212 monitors the shared signal for an increase in the value of the signal 220, as at block 516. If the auxiliary controller 212 does not detect an increase in the value of the shared signal 220 for a specified period of time, as at block 518, the auxiliary controller 212 restarts the timer 222, as at block 506. A failure to detect a change in shared signal 220 (decrease and/or increase) by the auxiliary controller 212 may be indicative of the failure of the parallel power supply 104.

Returning now to block 508, if after expiration of the first interval (block 519) the auxiliary controller 212 of the first power supply 104 determines that an incremental change in value of the shared signal 220 did not occur during the first interval of the timer 222 of the first power supply 104, the auxiliary controller 212 of the first power supply 104 may incrementally increase the value of the shared signal 220 in response to the expiration of the first interval of the timer 222 of the first power supply 104, as at block 520. The timer 222 of the first power supply 104 may be reset and restarted for a second interval, as at block 522. The auxiliary controller 212 awaits the expiration of the second interval, as at block 524, and then relinquishes control of the shared signal 220 after the expiration of the second interval, as at block 526.

After relinquishing control of the shared signal 220, the auxiliary controller 212 monitors the shared signal 220 for a decrease in value of the shared signal 220, as at 528, to determine if the auxiliary controller 212 was responsible for the incremental increase in the value of the shared signal 220 at block 520. If the value of the shared signal 220 does not decrease after the auxiliary controller relinquishes control of the shared signal 220, it may be indicative of another parallel power supply 104 having increased the value of the shared signal 220 at block 508. Thus, the method 500 returns to block 512 to determine if a parallel power supply 104 is in control of the shared signal 220.

If the value of the shared signal 220 does drop in value at block 528, it may be indicative of the auxiliary controller 212 of the first power supply 104 being in control of the shared signal 220, and thus may incrementally increase the value of the shared signal 220 again at block 530. The value of the shared signal 220 may then be compared to a threshold value, as at block 532. If the value of the shared signal 220 is at the threshold value, the value of the shared signal 220 is set to a maximum value, as at block 534. If the value of the shared signal 220 is not at the threshold value, the method 500 terminates, as at block 536.

In an instance in which the shared signal 220 is set to the maximum value, each auxiliary controller 212 may detect the maximum value and proceed to enable the respective power supply 104. By enabling each of the power supplies 104 at the same time, the startup of the power supplies 104 is synchronized and thus see the auxiliary load 108 at the same time. Accordingly, the power consumed by the auxiliary load 108 may be provided by the power supplies 104 collectively, and overcurrent of any one or more of the power supplies 104 may be prevented.

Figure 6:
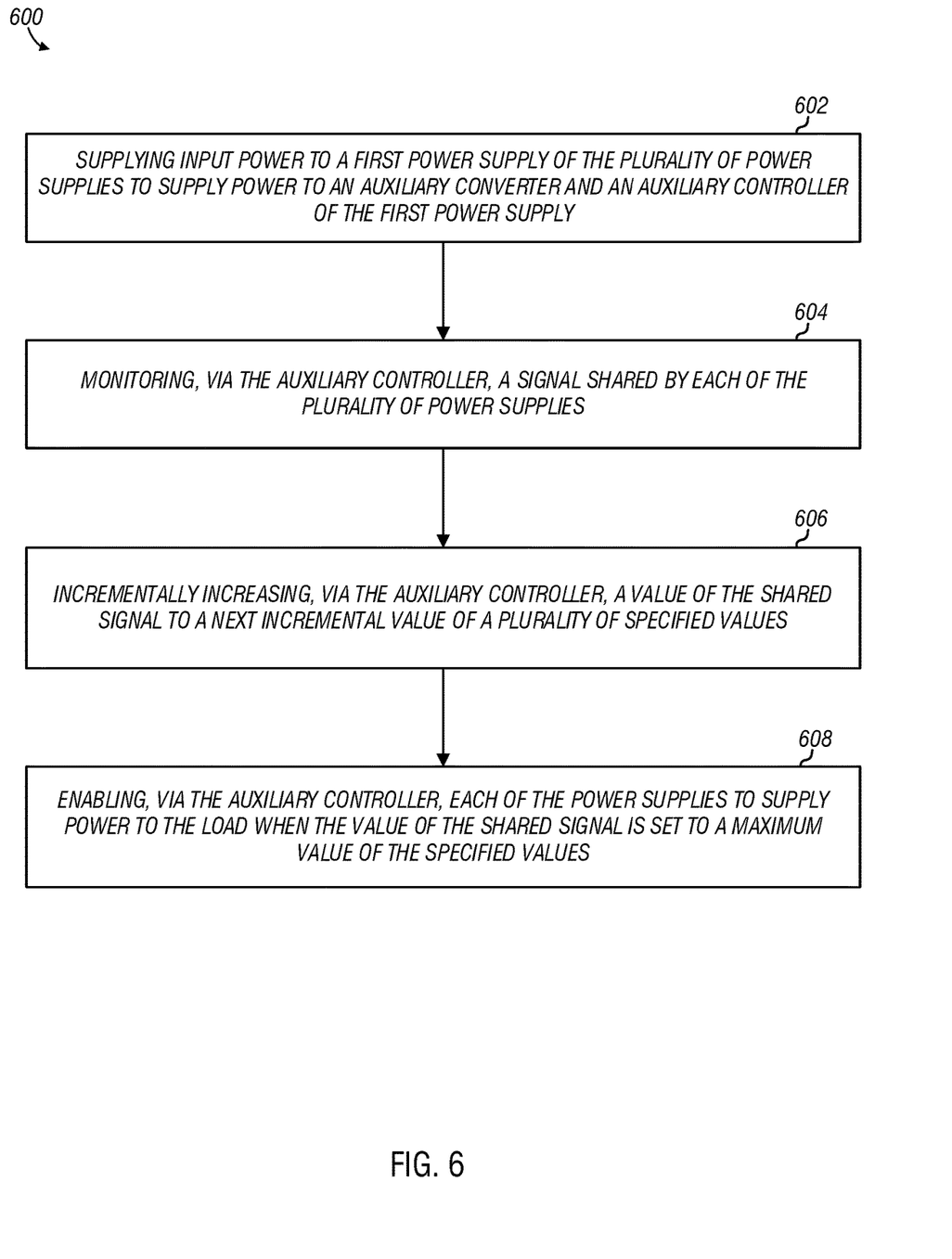
FIG. 6 is a flow chart depicting a method for synchronizing startup of a plurality of power supplies electrically coupled in parallel, according to one or more examples of the disclosure.

FIG. 6 is a flowchart depicting a method 600 for synchronizing startup of a plurality of power supplies electrically coupled in parallel, according to one or more examples of the disclosure. In discussing FIG. 6, reference is made to FIGS. 1-3 to provide contextual examples. Implementation, however, is not limited to those examples.

The method 600 may start at block 602 and includes supplying input power 101 to a first power supply 104 of the plurality of power supplies 104 to supply power to an auxiliary converter 210 and an auxiliary controller 212 of the first power supply 104. The method 600 may also include monitoring, via the auxiliary controller 212, a signal 220 shared by each of the plurality of power supplies 104, as at block 604. The method 600 may further include incrementally increasing, via the auxiliary controller 212, a value of the shared signal 220 to a next incremental value of a plurality of specified values, as at block 606. The method 600 may also include enabling, via the auxiliary controller 212, each of the power supplies 104 to supply power to the load 108 when the value of the shared signal 220 is set to a maximum value of the specified values, as at block 608.

As used herein, a "processor" may include any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc.

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for synchronizing startup of a plurality of power supplies electrically coupled in parallel, comprising:
supplying input power to a power supply of the plurality of power supplies to supply power to an auxiliary converter and an auxiliary controller of the power supply;
monitoring, via the auxiliary controller, a shared signal by each of the plurality of power supplies;
incrementally increasing, via the auxiliary controller, a value of the shared signal to a next incremental value of a plurality of specified values;
determining, via the auxiliary controller, whether the shared signal is at a threshold value;
setting, via the auxiliary controller, the shared signal to a maximum value to enable each of the plurality of power supplies to supply power to the load in response to the shared signal being at the threshold value;
enabling, via the auxiliary controller, each of the plurality of power supplies to supply power to a load when the value of the shared signal is set to the maximum value of the specified values;
initiating a timer for a first interval, wherein monitoring the shared signal further comprises monitoring the shared signal for an incremental change in value of the shared signal by a parallel power supply during the first interval of the timer, and wherein incrementally increasing the value of the shared signal to the next incremental value of the plurality of specified values further comprises incrementally increasing the value of the shared signal in response to expiration of the first interval of the timer;
restarting, via the auxiliary controller, the timer to run for a second interval; and
releasing, via the auxiliary controller, the shared signal after the expiration of the second interval.

2. The method of claim 1, further comprising determining, via the auxiliary controller, that the load connected to the plurality of power supplies is not powered by at least one other power supply of the plurality of power supplies.

3. The method of claim 1, further comprising:
resetting, via the auxiliary controller, the timer in response to the incremental change in the value of the shared signal during the first interval of the timer,
wherein monitoring the shared signal by each of the plurality of power supplies further comprises monitoring, via the auxiliary controller, the shared signal for a decrease in value of the shared signal by the parallel power supply.

4. The method of claim 3, further comprising restarting, via the auxiliary controller, the timer in response to the shared signal not decreasing in value.

5. The method of claim 3, wherein monitoring the shared signal by each of the plurality of power supplies further comprises monitoring, via the auxiliary controller, the shared signal for an increase in value of the shared signal by the parallel power supply in response to the decrease in value of the shared signal.

6. The method of claim 5, further comprising restarting, via the auxiliary controller, the timer in response to the increase in value of the shared signal.

7. The method of claim 1, wherein incrementally increasing the value of the shared signal to the next incremental value of the plurality of specified values further comprises incrementally increasing, via the auxiliary controller, the value of the shared signal in response to the shared signal decreasing in value after releasing the shared signal after the expiration of the second interval of the timer.

8. An electrical system comprising:
a main load;
an auxiliary load;
a plurality of power supplies operating in parallel with one another to supply power to each of the main load and the auxiliary load, each power supply of the plurality of power supplies comprising:
a main converter to supply power to the main load via a main output;
an auxiliary converter to supply power to the auxiliary load via an auxiliary output;
an auxiliary controller electrically coupled to the auxiliary converter, the auxiliary controller further being communicatively coupled to each auxiliary controller of the other power supplies of the plurality of power supplies via a shared signal; and
a non-transitory computer-readable storage medium comprising instructions executable by the auxiliary controller to:
monitor the shared signal;
incrementally increase a value of the shared signal to a next incremental value of a plurality of specified values;
determine whether the next incremental value is a threshold value;
set the shared signal to a maximum value of the plurality of specified values when the next incremental value is the threshold value;
enable the auxiliary converter to supply power to the auxiliary load when the value of the shared signal is set to the maximum value of the plurality of specified values;
initiate a timer for a first interval, wherein monitoring the shared signal further comprises instructions to monitor the shared signal for an incremental change in value of the shared signal by a parallel power supply during the first interval of the timer, and wherein incrementally increasing the value of the shared signal to the next incremental value of the plurality of specified values further comprises instructions to incrementally increase the value of the shared signal in response to expiration of the first interval of the timer;
restart the timer to run for a second interval; and
release the shared signal after the expiration of the second interval.

9. The electrical system of claim 8, wherein the non-transitory computer-readable storage medium further comprises instructions executable by the auxiliary controller to reset the timer in response to the incremental change in the value of the shared signal during the first interval of the timer, and the instructions executable by the auxiliary controller to monitor the shared signal further comprise instruction to monitor the shared signal for a decrease in value of the shared signal by the parallel power supply.

10. The electrical system of claim 9, wherein:
the instructions executable by the auxiliary controller to monitor the shared signal further comprise instruction to monitor the shared signal for an increase in value of the shared signal in response to the shared signal decreasing value;
the non-transitory computer-readable storage medium further comprises instructions executable by the auxiliary controller to restart the timer in response to the increase in value of the shared signal; and
the non-transitory computer-readable storage medium further comprises instructions executable by the auxiliary controller to restart the timer in response to the value of the shared signal not decreasing in value.

11. The electrical system of claim 8, wherein the instruction to incrementally increase the value of the shared signal to the next incremental value of the plurality of specified values further comprises incrementally increasing the value of the shared signal in response to the shared signal decreasing in value after releasing the shared signal the expiration of the second interval of the timer.

12. A non-transitory computer-readable medium comprising computer executable instructions stored thereon that when executed by a processor, cause the processor to:
monitor a shared signal by a plurality of power supplies connected in parallel to an auxiliary load;
incrementally increase a value of the shared signal to a next incremental value of a plurality of specified values;
determine whether the next incremental value is a threshold value;
set the shared signal to a maximum value of the plurality of specified values when the next incremental value is the threshold value;
enable each of the plurality of power supplies to supply power to the auxiliary load when the value of the shared signal is set to the maximum value of the plurality of specified values; and
initiate a timer for a first interval, wherein monitoring the shared signal further comprises monitoring the shared signal for an incremental change in value of the shared signal by a parallel power supply during the first interval of the timer, and wherein incrementally increasing the value of the shared signal to the next incremental value of the plurality of specified values further comprises incrementally increasing the value of the shared signal in response to expiration of the first interval of the timer.

13. The non-transitory computer-readable medium of claim 12, further comprising computer executable instructions stored thereon that when executed by the processor, cause the processor to:
restart the timer to run for a second interval; and
release the shared signal after the expiration of the second interval,
wherein the computer executable instructions to incrementally increase the value of the shared signal to the next incremental value of the plurality of specified values further comprises incrementally increasing the value of the shared signal in response to the shared signal decreasing in value after releasing the shared signal after the expiration of the second interval of the timer.

* * * * *